C. H. WOLFE.
POWER SHOVEL.
APPLICATION FILED JAN. 23, 1920.

1,405,652.

Patented Feb. 7, 1922.
5 SHEETS—SHEET 1.

INVENTOR.
Cyrus H. Wolfe
BY J. Hanson Boyden,
ATTORNEY

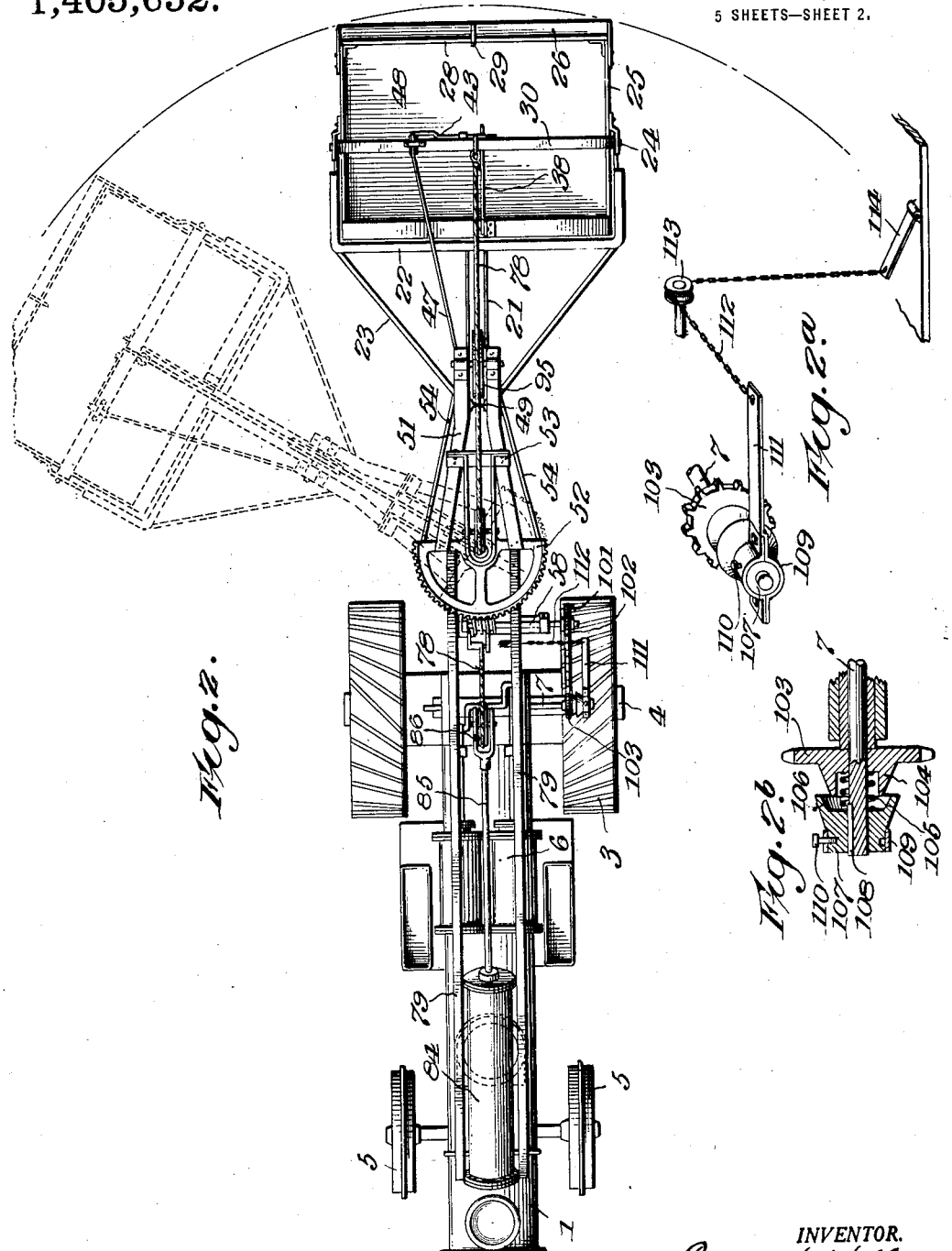

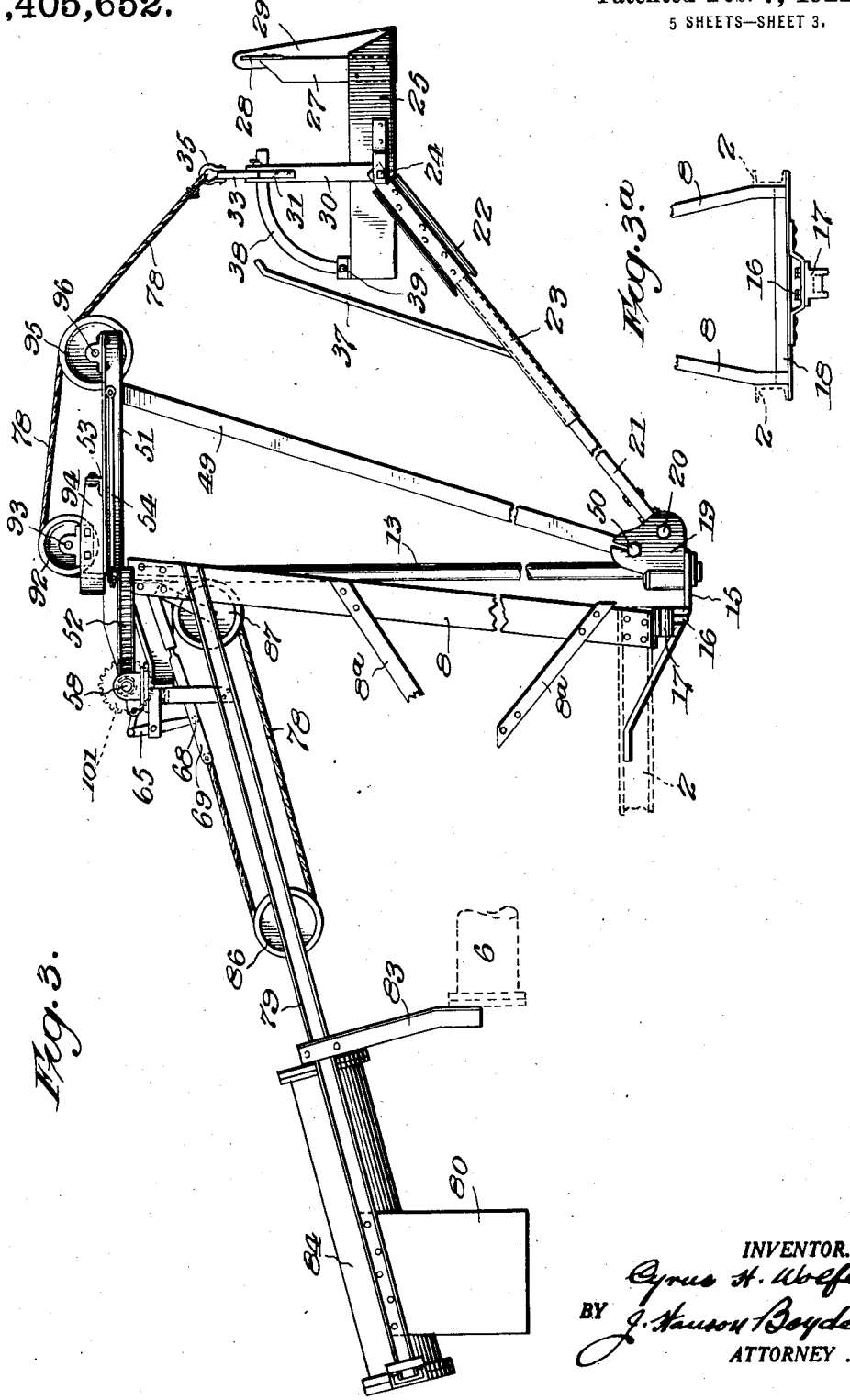

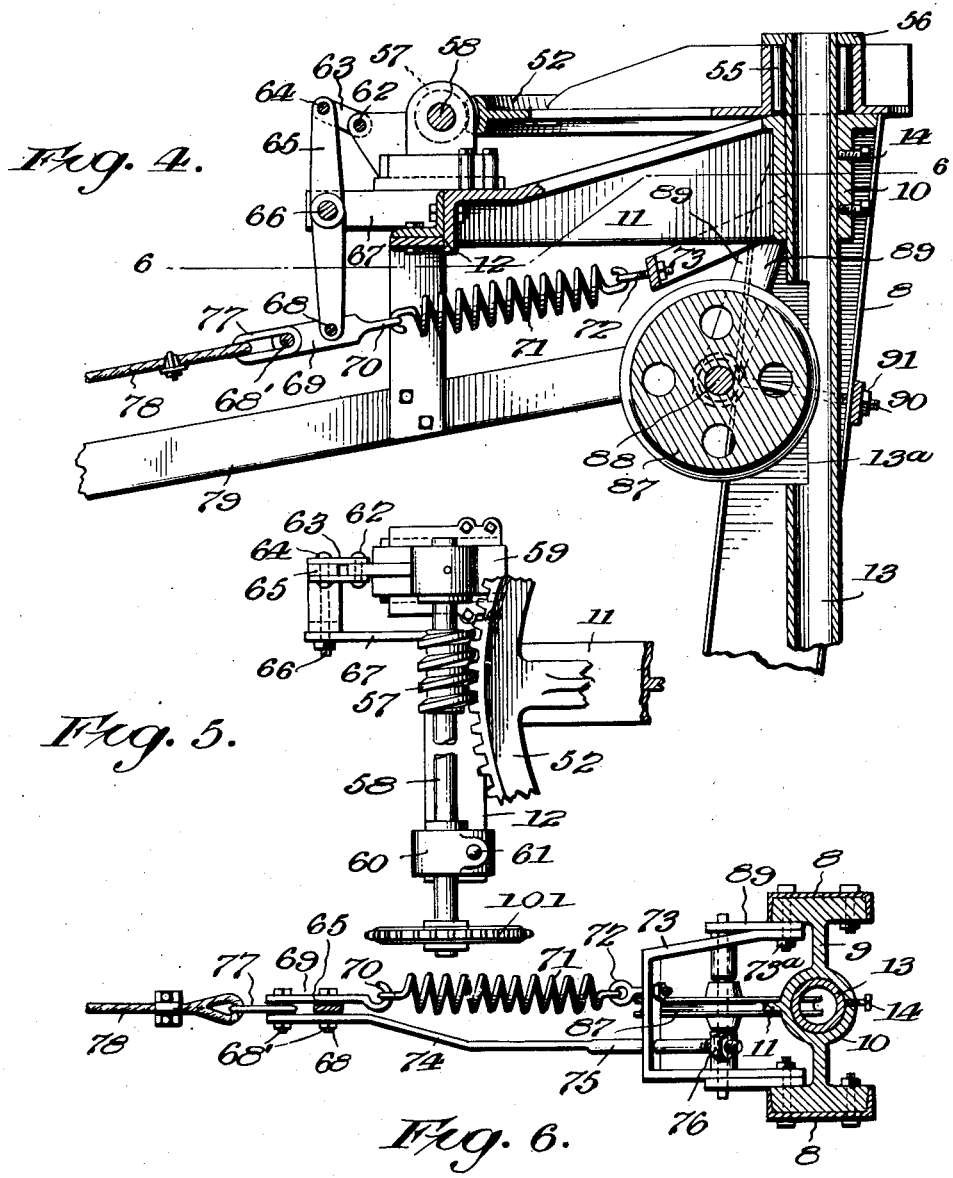

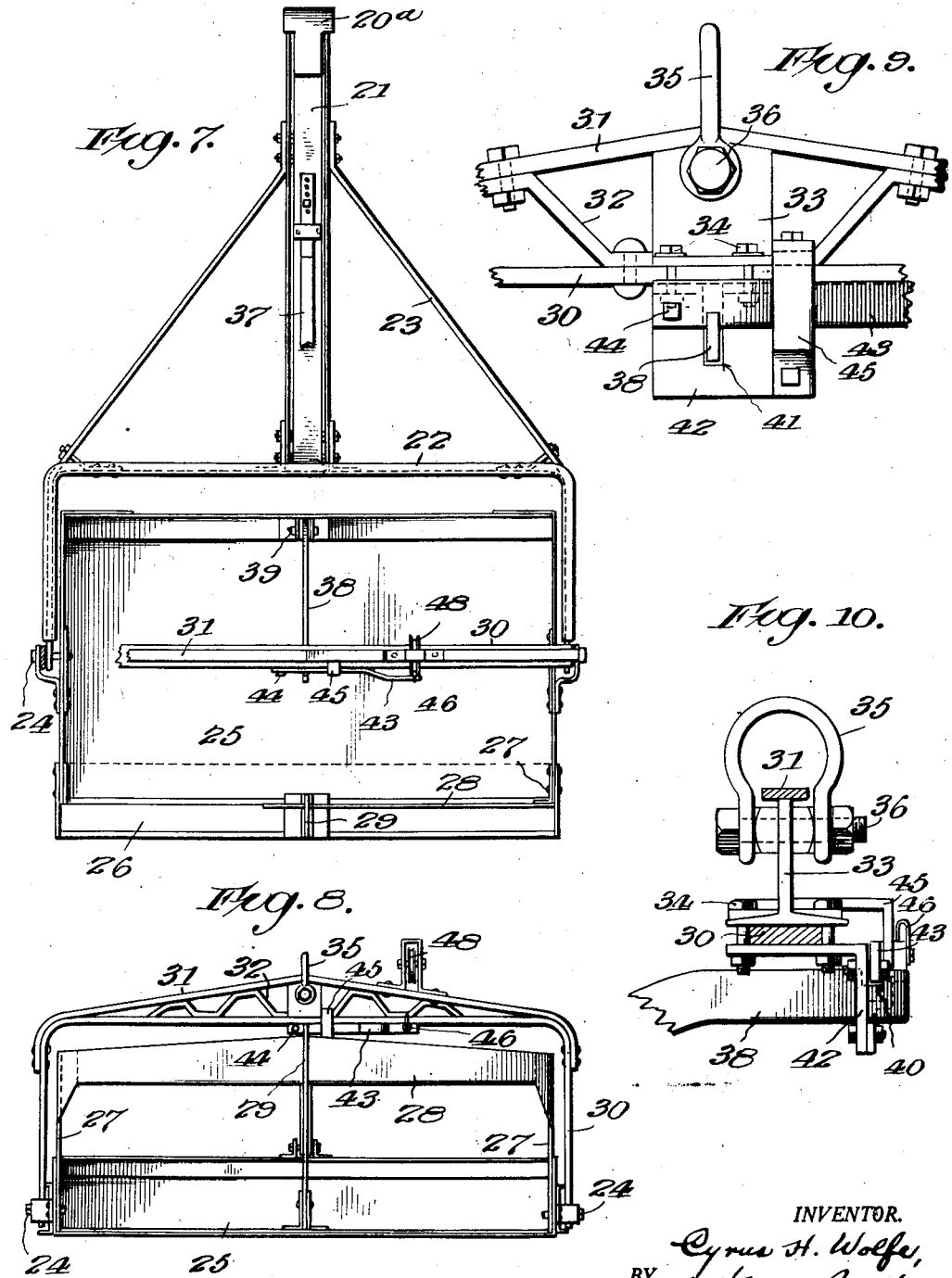

UNITED STATES PATENT OFFICE.

CYRUS HARLAN WOLFE, OF CHARLOTTE, NORTH CAROLINA, ASSIGNOR OF ONE-FOURTH TO L. R. HEINTZ AND ONE-FOURTH TO CARL M. HEINTZ, BOTH OF CABARRUS COUNTY, NORTH CAROLINA.

POWER SHOVEL.

1,405,652.  Specification of Letters Patent.  Patented Feb. 7, 1922.

Application filed January 23, 1920. Serial No. 353,560.

*To all whom it may concern:*

Be it known that I, CYRUS HARLAN WOLFE, a citizen of the United States, residing at Charlotte, in the county of Mecklenburg and State of North Carolina, have invented certain new and useful Improvements in Power Shovels, of which the following is a specification.

This invention relates to power shovels, and more particularly to a shovel attachment for traction engines or tractors.

In my prior Patents No. 798,246, dated August 29, 1905, and No. 898,618, dated September 15, 1908, I have shown and described power shovel devices attached to the front end of a traction engine, or the like, that is, the end adjacent the steering wheels, and remote from the traction wheels. With such an arrangement, I have found in practice that in some instances, the weight of the load tends to lift the traction wheels off the ground, and thus deprive the machine of its driving power, and it is one of the main objects of the present invention to overcome this difficulty.

To this end, I now contemplate mounting the shoveling device at the rear end of the traction engine, that is, adjacent the traction wheels thereof, so that the weight or resistance of the load will be borne by such wheels, thus increasing the traction in accordance with the load, or the resistance offered by the shovel.

Another object of the invention is to provide an improved arrangement of boom and struts for supporting the shovel and operating means therefor.

A still further object of the invention is to produce an improved construction of the shovel itself, and the locking and controlling means therefor.

With the above and other objects in view, as will hereinafter appear, and to improve generally on the structural details of such devices, the invention consists in the construction, arrangement and combination of parts hereinafter described and claimed, and illustrated in the accompanying drawings, in which:—

Fig. 2 is a plan view thereof showing the shovel in two positions, as indicated by full and dotted lines;

Figure 1:
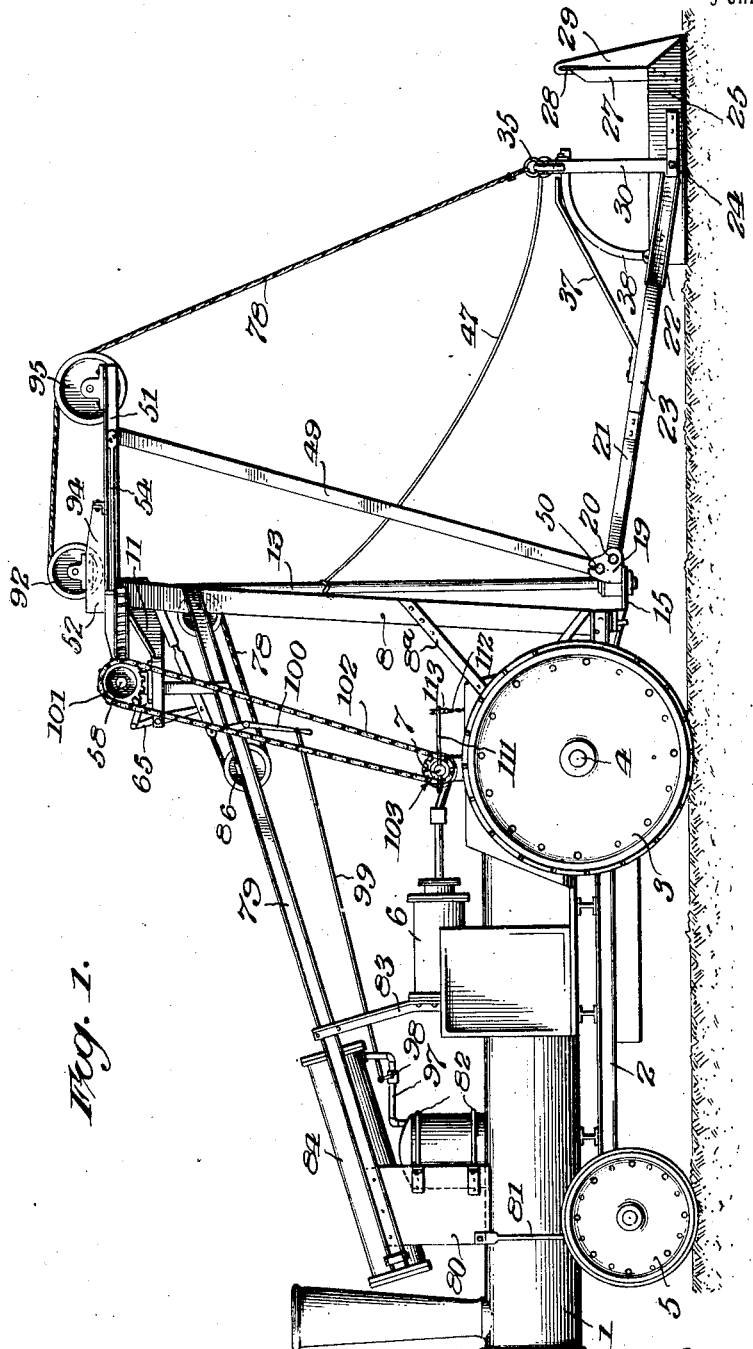
Fig. 1 is a side elevation of my complete machine.

Fig. 2$^a$ is a fragmentary perspective view of a clutch which I employ and operating mechanism therefor;

Fig. 2$^b$ is a fragmentary longitudinal section through such clutch;

Fig. 3 is a side elevation of the shoveling device detached from the engine and drawn to a larger scale than Fig. 1, the shovel being shown in the raised position;

Fig. 3$^a$ is a fragmentary rear elevation of the engine frame showing the means for supporting the shovel device thereon;

Fig. 4 is an enlarged vertical section through the upper part of the shovel supporting and operating mechanism, parts being in elevation;

Fig. 5 is a fragmentary plan view of the parts shown in Fig. 4;

Fig. 6 is a horizontal section substantially on the line 6—6 of Fig. 4, parts being shown in plan and other parts being broken away;

Fig. 7 is a plan view of the shovel and boom, parts being broken away;

Fig. 8 is a front elevation of the shovel and associated parts;

Fig. 9 is a fragmentary, enlarged front elevation of a portion of the supporting bail and shovel locking device; and Fig. 10 is a transverse, vertical section through such bail, showing the locking mechanism in side elevation.

While it will of course be understood that my improved shoveling device can be attached to and operated by a traction engine or tractor of any well known type, driven either by steam power or by an internal combustion engine, I have shown in the present case, such shoveling device attached to a steam traction engine.

Referring to the drawings in detail such engine comprises the usual horizontal boiler 1 supported on a suitable frame 2 at the rear end of which is a pair of traction wheels 3 mounted on an axle 4, and at the forward end of which are shown steering wheels 5. It will be noted that the boiler 1 and frame 2 constitute an elongated body with the traction wheels disposed adjacent one end thereof.

The usual engine cylinders are designated at 6, and these are operatively connected to the crank shaft 7 by means of which propelling power is applied to the traction wheels in any suitable way, the details of such mechanism being well known and not being illustrated in the drawings.

My improved shoveling device comprises a rigid vertically extending frame and shovel operating mechanism supported by such frame. This frame preferably comprises a pair of channel beams 8 secured at their lower ends to the side members 2 of the engine frame, at the rear end of such frame, adjacent the traction wheels and strengthened by members 8a. Between the upper ends of the beams or struts 8 is rigidly bolted a casting 9 of the shape shown in Figs. 4 and 6. This casting is provided with a central cylindrical portion 10 in which is received the upper end of a hollow vertical shaft 13 which is rigidly clamped in the casting 9 by means of set screws 14. The casting 9 is provided with a forwardly extending bracket 11 having an arm 12 projecting laterally therefrom at the end thereof for a purpose which will hereinafter appear.

The lower end of the vertical hollow shaft 13 is supported by a foot-plate 15 secured in a hanger 17, as by means of a U-bolt 16 (see Fig. 3a), the hanger 17 being carried by a cross bar 18 supported by the engine frame 2.

It will be understood that the shaft 13 is fixed and journalled thereon at the lower end thereof is a swivel block 19. This block also rests upon the plate 15 and is preferably provided with anti-friction bearings (not shown).

Pivoted at 20 to the swivel block 19 is a boom 21 which supports the shovel. This boom as shown in Fig. 7, is provided at its pivot end with a journal member 20a and is rigidly secured at its other end to a U-shaped yoke 22. Braces 23 preferably extend from the yoke to the boom to lend rigidity to the structure. The free ends of the yoke are pivoted at 24 to the sides of a shovel designated in its entirety by the reference numeral 25. The pivots 24 are so located that the shovel, while nearly balanced, has a tendency to tip downwardly to discharging position, and will in fact swing by gravity to such position unless restrained.

The shovel as shown has a flat bottom provided with a free edge, and to such edge is preferably secured a reinforcing plate 26.

In order to prevent the bottom of the shovel from sagging, and to render the same more rigid, I have devised the novel construction forming an important part of the present invention. This consists of a beam or truss 28 supported at its ends by posts 27 secured to the sides of the shovel and a bar 29 secured at its upper end to the beam 28 and at its lower end to the free edge of the shovel bottom (see Fig. 8). This bar 29 is relatively thin and flat and disposed edgewise longitudinally of the shovel so as not to interfere with the passage of material into or out of the same. By virtue of this arrangement it will be seen that the bottom of the shovel is thus supported at its middle point, and prevented from sagging or buckling.

In order to raise and lower the shovel I provide a supporting bail designated in its entirety by the reference numeral 30 and attached at its free ends to the pivots 24. The middle portion of this bail is preferably of trussed construction and comprises a reinforcing member 31 spaced from the main member and braced by means of bridgework 32, all as clearly shown in Figs. 8 and 9. At the center of the bail is located a plate 33 secured by bolts 34 to the bail member 30 and attached to this plate by means of a pivot pin 36 is a clevis 35.

An adjustable brace arm 37 is secured to the boom 21 and projects forwardly so that its free end is in position to engage the plate 33 in certain positions of the shovel, as for example in Fig. 1, and limit the angular movement of the bail 30 relative to the boom.

When in operation the shovel is locked rigidly to the bail 30 by means of a curved arm 38 secured to the rear edge of the shovel at 39 and extending through an opening 41 in a bracket 42 also supported by the bolts 34 (see Fig. 10). In the upper edge of the free end of the arm 38 is formed a notch 40 (Fig. 10), and adapted to engage this notch is a latch 43 pivoted at 44 to the bracket 42 and having a keeper 45 to hold it in position. The free end of this latch preferably carries a clevis 46 to which is attached a line 47 passing over a suitable pulley 48 mounted on the bail and extending back to the operator's position on the engine platform as clearly shown in Fig. 1.

Referring again to Fig. 10 it will be particularly noted that the notch 40 is wider than the thickness of the latch 43. The result of this is that a slight play or angular displacement of the shovel with respect to the bail 30 is permitted, even when the latch is in locking position in the notch 40.

A strut 49, preferably in the form of an I-beam is also supported at 50 by the swivel block 19 and is secured at its upper end between a pair of short horizontal beams 51 (see Fig. 2). The forward ends of these beams are somewhat spread apart and are rigidly secured to a semicircular worm wheel or rack 52 at opposite sides of the center thereof. The beams 51 are further braced by a cross-bar 53 and by brace rods 54 extending to the worm gear 52.

The gear wheel 52 is journalled on the upper end of the hollow shaft 13, preferably by means of antifriction bearings 55, and is secured in position by a suitable cap 56.

Arranged to mesh with the worm wheel 52 is a worm 57, mounted on a shaft 58 supported in bearings 59 and 60. The bearing 59 is mounted on guideways so as to be capable of sliding toward and from the gear wheel 52, while the bearing 60 is mounted to swing about a pivot 61, all as shown in Fig. 5. The bearings 59 and 60 are supported by the bracket 11 and arm 12 forming a part of the casting 9 above referred to. Secured to the bearing 59 as at 62 is a link 63 pivoted at its other end at 64 to one arm of a double bell-crank lever 65, journalled at 66 in a supporting bracket 67. The other arm of the lever is pivoted at 68 to a member 69 having at one end a hook 70 in which is engaged one end of a helical spring 71. The other end of this spring is secured to an I-bolt 72 carried by the yoke 73 secured to the casting 9 and beams 8 by means of bolts 73a, as shown in Fig. 6.

A rod 74 is also connected to the bolt 68 and extends through an opening in the yoke 73, through which opening the rod is free to slide. The end 75 of the rod which projects inside of the yoke 73 is screw-threaded and carries an adjustable nut 76. It will be seen that this nut 76 will engage the inside of the yoke and thus limit the expanding movement of the spring 71 and associated parts.

A bolt 68' also passes through the members 69 and 74 and on this bolt is carried a link 77 to which the end of the cable 78 is secured.

This cable which is employed for raising the shovel, as hereinafter described, may be operated in various ways without departing from the spirit of my invention. For example it may be wound upon a drum driven from the engine shaft, or operated in any other suitable way. In the present embodiment of the invention, however, in which I have illustrated a steam traction engine, I have also shown a steam power cylinder for actuating the hoisting cable.

This power cylinder is designated by 84 and is mounted between a pair of inclined beams 79 secured at their upper ends to the beams 8 and at their lower ends to a saddle 80. This saddle consists of a pair of spaced side plates and, as shown in Fig. 1, is secured to the boiler by means of a girth rod 81. It is also anchored to the usual steam dome forming part of the boiler by means of tie rods 82. A brace 83 also preferably extends from each beam 79 to the engine cylinders 6.

Within the power cylinder 84 works a suitable piston having a piston rod 85 carrying at its free end a bracket in which a pulley 86 is journalled. A second pulley 87 is journalled on a shaft 88 supported by hangers 89 (see Figs. 4 and 6) and capable of adjustment toward and from the shaft 13 by means of I-bolts 90 having nuts 91. As shown in Fig. 4 the shaft 13 is cut away adjacent the pulley 87 as indicated at 13a and this pulley is so adjusted that its periphery is disposed approximately at the center of the hollow shaft 13.

Mounted on a shaft 93 supported by a yoke 94, carried on the beams 51 is a pulley 92, the periphery of which is disposed immediately above the center of the hollow shaft 13, and in a vertical line with the periphery of pulley 87. A fourth pulley 95 is mounted on a shaft 96 carried by the beams 51 as clearly shown in Figs. 1 and 3.

The cable 78 is attached, as above stated, at one end to the lever 65 and bolt rod 74. It is then led around the pulley 86 and from thence it passes around pulley 87 up through the hollow shaft 13 to and around pulley 92, thence over pulley 95 to the shovel, where it is secured to the clevis 35.

Steam is supplied to the power cylinder 84 by means of a pipe 97 controlled by a valve 98 operated by means of a rod 99 from a handle 100 pivoted within reach of the operator.

Mounted at the end of shaft 58 (see Fig. 5) is a sprocket wheel 101 and around this wheel passes a sprocket chain 102, which chain also engages a sprocket wheel 103 (see Figs. 2a and 2b) loosely mounted on the crank shaft 7. The sprocket wheel 103 carries a clutch cone 104 adapted to be engaged by the friction face 106 of a clutch member 107 keyed on the crank shaft as indicated at 108 but capable of sliding thereon. A spring 105 tends to normally support the clutch members. The clutch is thrown into engagement by means of a collar 109 having a pin 110 working in a groove in the clutch member 107 and provided with a lever arm 111. A chain or the like 112 is secured at one end to the lever arm 111 and, after passing around a pulley 113 to change its direction, is secured at the other end to a pivoted pedal 114 preferably mounted on the engine platform.

The operation of the machine will be apparent. When it is desired to fill the shovel with the parts in the position shown in Fig. 1 the traction engine is simply reversed and caused to back up slowly thus forcing the shovel into the ground or other material to be excavated. The brace 37 prevents the free end of the shovel from tilting up during the filling operation. If, owing to the nature of the ground or material, the shovel should fail to fill properly, a very slight tension is applied to cable 78, by admitting a small quantity of steam to the cylinder 84. This slight lift on the cable tends to tip the nose of the shovel downwardly and cause it to bite into the material. This slight tipping action is possible by virtue of the play or lost motion due to the fact that the notch 40 (Fig. 10) is wider than the latch 43.

When the shovel has been properly filled with material the movement of the engine over the ground is stopped, and steam admitted to the power cylinder 84. This results in retracting the pulley 86 and thus causing the cable to raise the shovel into the position shown in Fig. 3. If required the engine may now be caused to run backwardly or forwardly to any point where it is desired to deposit the load. The shovel may then be dumped by a pull on the line 47 which releases the latch and permits the shovel to tip forwardly about its pivots 24 into dumping position.

If it is desired, as is usually the case, to discharge the material at one side or the other of the engine the shovel and its supporting mechanism may be swung around the shaft 13 as a center, as indicated in dotted lines in Fig. 2. This is accomplished by means of the clutch and sprocket wheels above described. The operator places his foot upon the pedal 114 thus forcing the clutch members into engagement. If then the crank shaft is operated in one direction or the other, the transmission gear being of course disconnected from the traction wheels, the worm 57 will be driven and will rotate the worm wheel 52, the beams 51 and associated parts around the axis of said worm wheel 52, which axis, as above stated, is the shaft 13. At the same time the boom 21 carrying the shovel will swing, with the block 19 around the lower end of the shaft 13. Thus the boom or supporting mechanism, and the cable or hoisting mechanism both swing with the shovel around a common vertical axis.

It will be observed that the weight of the load is carried by the engine frame adjacent the traction wheels. By virtue of this arrangement the heavier the load or the greater the resistance encountered by the shovel, the more firmly will the traction wheels be caused to engage the ground. Moreover it will be noted that the point of support of the shovel and the center of gravity of the traction engine lie on opposite sides of the axis of the traction wheels. With this arrangement it is obvious that the weight of the boiler and other engine parts on one side of the axis of the traction wheels will tend to counterbalance the load on the shovel, acting at the other side of the axis of the traction wheels. In this way all danger of the load causing the engine to tip or overturn is practically eliminated. It will be further observed that the worm and worm wheel serve to lock the shovel in any position to which it may be swung, thus avoiding the necessity for any brake drums or the like.

It would be obviously impractical for the worm and worm wheel to remain in engagement during the filling operation of the shovel as there is likely to be angular displacement of the shovel relative to the engine frame while it is being forced into the material. It is therefore necessary that the worm remain out of gear with the worm wheel, as in my prior Patent No. 898,618 at all times except when the load is actually being hoisted. To this end the hoisting cable is connected with the slidable bearing 59, carrying the worm shaft, in the manner described, so that when the strain comes upon the cable the worm will be forced into engagement with the worm wheel, the spring 71 yielding to permit such movement.

Obviously, however, it would be impractical to permit the full strain caused by the weight of the load to be carried by the gear teeth, and for this reason the bolt rod 74 is employed. It will be understood that the nut 76 on this bolt rod is so adjusted that it engages the yoke 73 just as the worm and worm wheel come into full mesh. The weight of the load is then carried by the bolt rod 74 and yoke 73, thus relieving the gears of excessive strain. By adjusting nut 76 the gears can be caused to properly mesh at all times regardless of wear or slight errors in the size or assembling of the parts. In my former patent above referred to no provision for adjustment of the means for protecting the gears from strain was made, and I have found in practice that it is of utmost importance to arrange for such adjustment.

What I claim is:

1. The combination with a tractor having traction means at one end and supporting means at the other, the center of gravity of the tractor being between the traction and supporting means, of a shovel having a rigid, non-extensible boom pivotally attached to the tractor adjacent the traction means, and constructed to be forced into the material to be excavated by the bodily movement of the tractor, driven by said traction means, and means for moving the boom on its pivot to raise and lower the shovel, said shovel being located on the opposite side of said traction means from the body of the tractor, whereby the load on the shovel serves to shift the center of gravity of the combined load and tractor nearer the traction means, thus increasing the weight thereon.

2. The combination with a tractor having traction wheels at one end and steering wheels at the other, of a shovel having a rigid, non-extensible boom pivotally attached to the tractor, to be propelled thereby, means for raising and lowering the shovel and for forcing it into the material to be excavated by the bodily travel of the tractor over the surface on which it rests, the point of attachment of the boom being adjacent the traction wheels, and the boom extending in a direction away from the body of the tractor, whereby the axis of the traction wheels lies between the body of the tractor and the shovel, and whereby the load on the shovel tends to increase the weight on the traction wheels.

3. The combination with a tractor frame having side sills, of a pair of upwardly extending struts secured at their lower ends to said side sills, a vertical shaft supported at its lower end by said sills and at its upper end by said struts, a rigid frame journaled on said shaft, shovel hoisting gear carried by said frame, and a shovel connected with said gear and having a boom with its end pivoted at a fixed point on said frame adjacent the base of said shaft.

4. The combination with a tractor having traction wheels, of a shovel having a boom with its end pivotally supported at a fixed point on the tractor for propulsion thereby and power means carried by the tractor for raising the shovel, the said power means and the pivotal point of the boom lying on opposite sides of the axis of the traction wheels, whereby the traction increases upon loading the shovel.

5. In a power shovel, the combination with a support, of a swinging frame and shovel mounted to oscillate freely about a common vertical axis, gear wheels for turning said frame about such axis when desired, said gear wheels being normally out of mesh, means for raising said shovel and simultaneously moving said gear wheels into mesh, and an adjustable stop for limiting such movement so as to protect said gear wheels from excessive strain.

6. The combination with a tractor having an elongated body, and provided with steering wheels at one end and traction wheels adjacent the other end, of a shovel having a rigid non-extensible boom pivotally attached to the tractor for propulsion thereby, means for raising and lowering the shovel and for causing it to be forced into the material to be excavated by power applied to the traction wheels, the point of attachment of the shovel boom being at the extreme end of the tractor beyond the axis of the traction wheels, whereby the load on the shovel serves to increase the weight applied to such wheels.

7. The combination with a steam tractor having a horizontal boiler and the usual steam dome, of a shoveling device attached to the tractor, a power cylinder for operating said shoveling device, and means for anchoring said power cylinder directly to said steam dome.

8. The combination with a steam tractor having a horizontal boiler and the usual steam dome, of a shoveling device attached to the tractor, a power cylinder for operating said shoveling device, a saddle on which said power cylinder is supported, and means for securing said saddle to the boiler and steam dome.

9. In a shoveling device, the combination with a shovel, of a boom on which the shovel is pivotally supported, a hoisting bail pivoted to the shovel, means for locking the bail relative to the shovel, and a brace carried by said boom and adapted to engage the locked bail to limit the movement of the shovel relative to the boom.

In testimony whereof I affix my signature.

CYRUS HARLAN WOLFE.